TELEVISION SYNCHRONIZING SIGNAL GENERATOR

Filed Oct. 18, 1947

5 Sheets-Sheet 1

INVENTORS
James H. Mulligan, Jr.
Arthur J. Talamini, Jr.

BY Charles W. Mortimer
ATTORNEY

SHAPER

INVENTORS
James H. Mulligan, Jr.
Arthur J. Talamini, Jr.
BY Charles W. Martinez
ATTORNEY June 12, 1951 J. H. MULLIGAN, JR., ET AL 2,556,933

TELEVISION SYNCHRONIZING SIGNAL GENERATOR

Filed Oct. 18, 1947 5 Sheets-Sheet 3

INVENTORS
James H. Mulligan, Jr.
Arthur J. Talamini, Jr.
BY Charles W. Mortimer
ATTORNEY INVENTORS
James H. Mulligan, Jr.
Arthur J. Talamini, Jr.
BY Charles W. Mortimer
ATTY June 12, 1951 J. H. MULLIGAN, JR., ET AL 2,556,933
TELEVISION SYNCHRONIZING SIGNAL GENERATOR
Filed Oct. 18, 1947 5 Sheets-Sheet 5
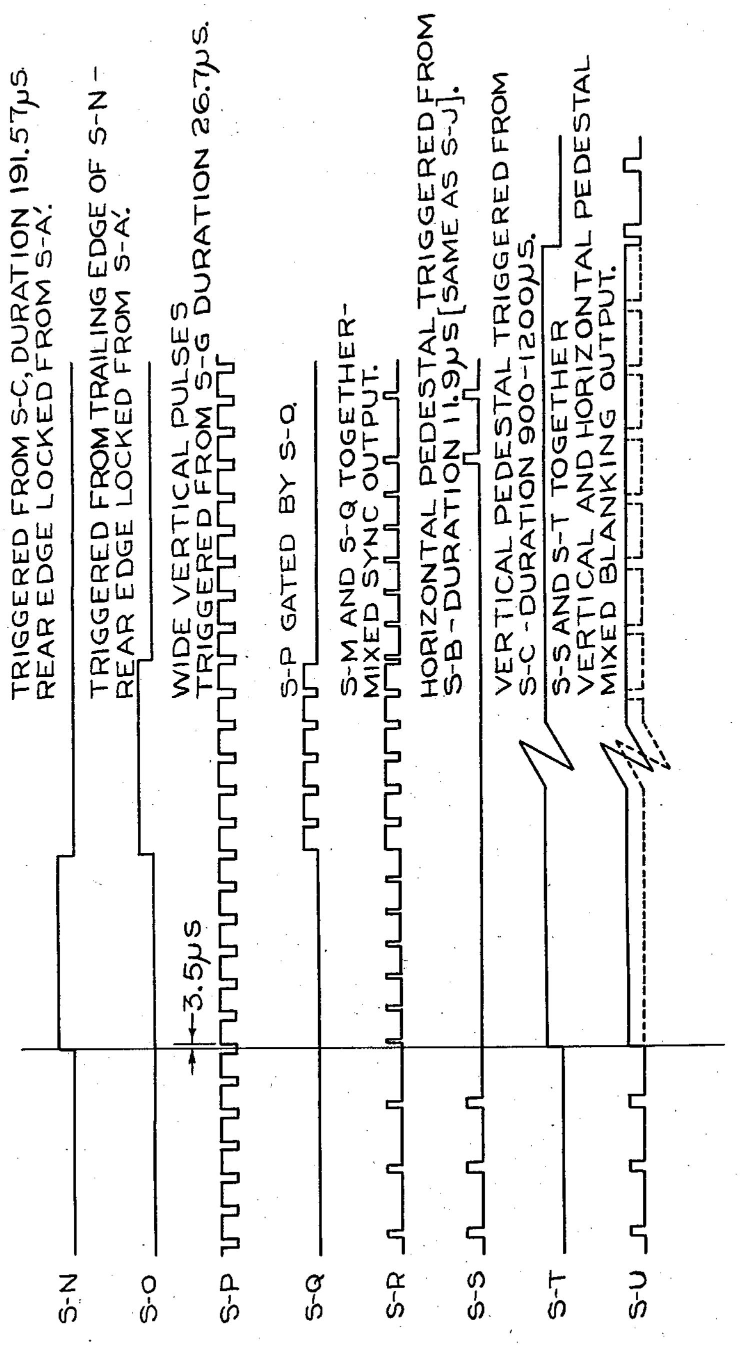
FIG. 3-A
INVENTORS
James H. Mulligan, Jr.
Arthur J. Talamini, Jr.
BY Charles W. Mortimer
ATTORNEY Patented June 12, 1951 2,556,933

UNITED STATES PATENT OFFICE 2,556,933

TELEVISION SYNCHRONIZING SIGNAL GENERATOR

James H. Mulligan, Jr., East Orange, and Arthur J. Talamini, Jr., Caldwell Township, Essex County, N. J., assignors to Allen B. Du Mont Laboratories, Inc., Passaic, N. J., a corporation of Delaware Application October 18, 1947, Serial No. 780,638

6 Claims. (Cl. 178—69.5)

This invention relates to a television synchronizing signal generator. It embodies and uses the devices and circuits shown in our co-pending applications, Ser. Nos. 780,640, 780,641, and 780,639, filed of even date herewith and entitled "A Stabilized and Gated Multivibrator," "A Coincidence Blocking Tube Oscillator" and "A Variable Delay Circuit," respectively.

This television synchronizing signal generator is for the purpose of producing mixed driving pulses, mixed blanking pulses and mixed synchronizing pulses, for operating a plurality of pick-up devices connected to the synchronizing signal generator by cables of different lengths. The generator may be considered as consisting of two basic sections, (1) the timer unit, in which oscillators and multivibrators produce signals with a definite time relationship to one another and (2) the shaper unit, in which delay networks, oscillators, multivibrators and clippers shape the signals emanating from the timer unit.

Signals are developed in the shaper unit from oscillators controlled by three types of trigger signals generated in the timer unit, one at 31.5 kilocycles per second, a second at 15.75 kilocycles per second and a third at 60 cycles per second. These signals are derived from the output of a 31.5 kilocycle sine wave oscillator. Driving signals comprise a 15.75 kilocycle per second pulse delayed half a line interval and a 60 cycle per second pulse for triggering the scanning sawtooth waves of the pick-up devices. The blanking signal comprises the vertical and horizontal pulses that serve to blank out the video signal during the retrace time and provide pedestals upon which the synchronizing signals ride. The mixed synchronizing signals comprise the equalizing pulses of 31.5 kilocycles, the horizontal pulses of 15.75 kilocycles and wide vertical pulses occurring in groups of six at a repetition rate of 60 per second.

By this invention the delayed driving signals are obtained by keying the equalizing signals with the signal appearing on the grid of the 15.75 kilocycle blocking oscillator, shown in application, Ser. No. 780,641, filed of even date herewith, entitled "A Coincidence Blocking Tube Oscillator." These delayed signals are then mixed with the 60 cycles per second pulses obtained by dividing down the 31.5 kilocycle pulses. Two special forms of keyed stabilized multivibrators are used in shaping the synchronizing and blanking signals, shown in application, Ser. No. 780,640, filed of even date herewith, entitled "A Stabilized and Gated Multivibrator."

The present invention will be described as a synchronizing signal generator for a television transmitter designed to produce a standard synchronizing signal in accordance with the standards established by the Federal Communications Commission.

Figure 1:
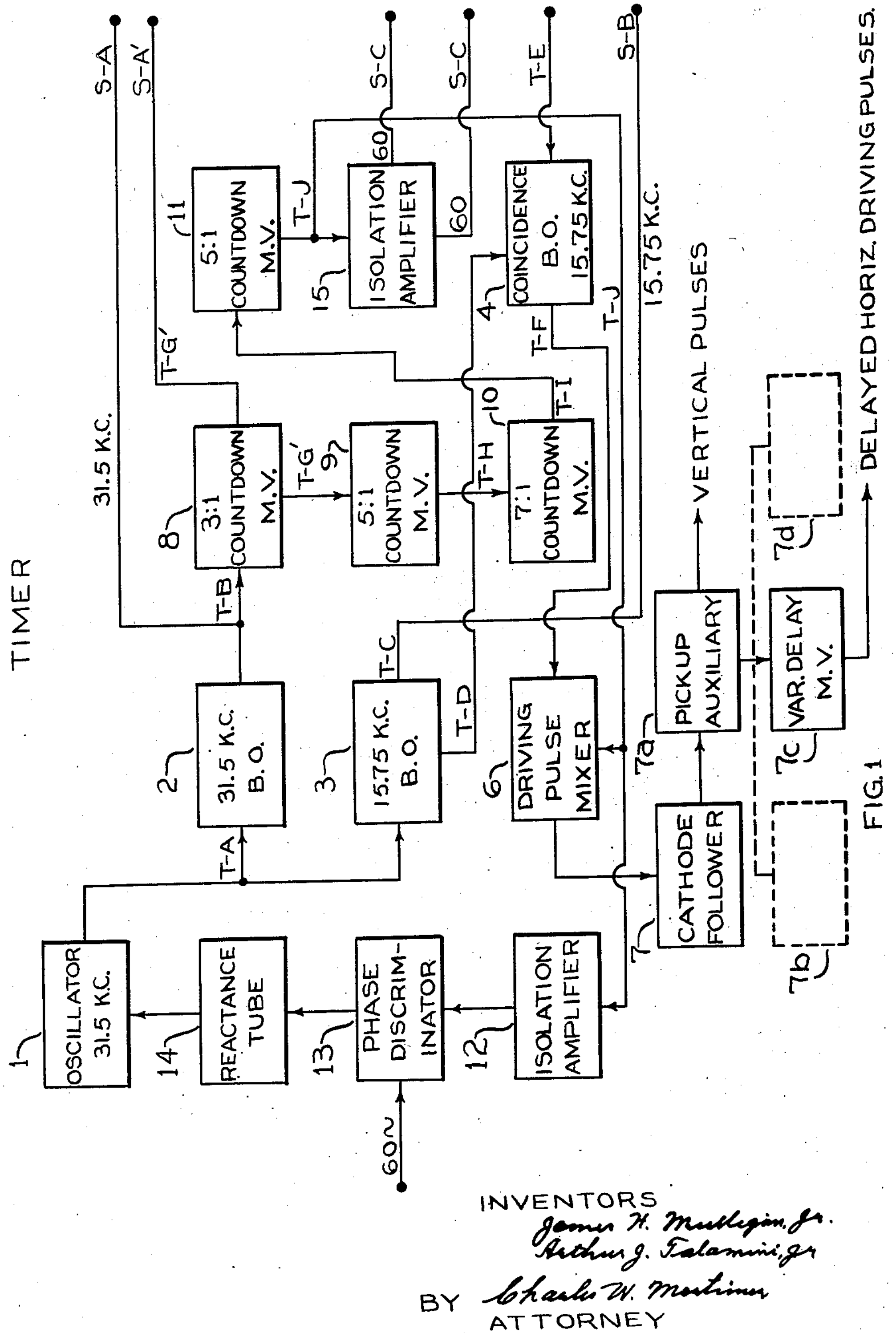
Figure 1A:
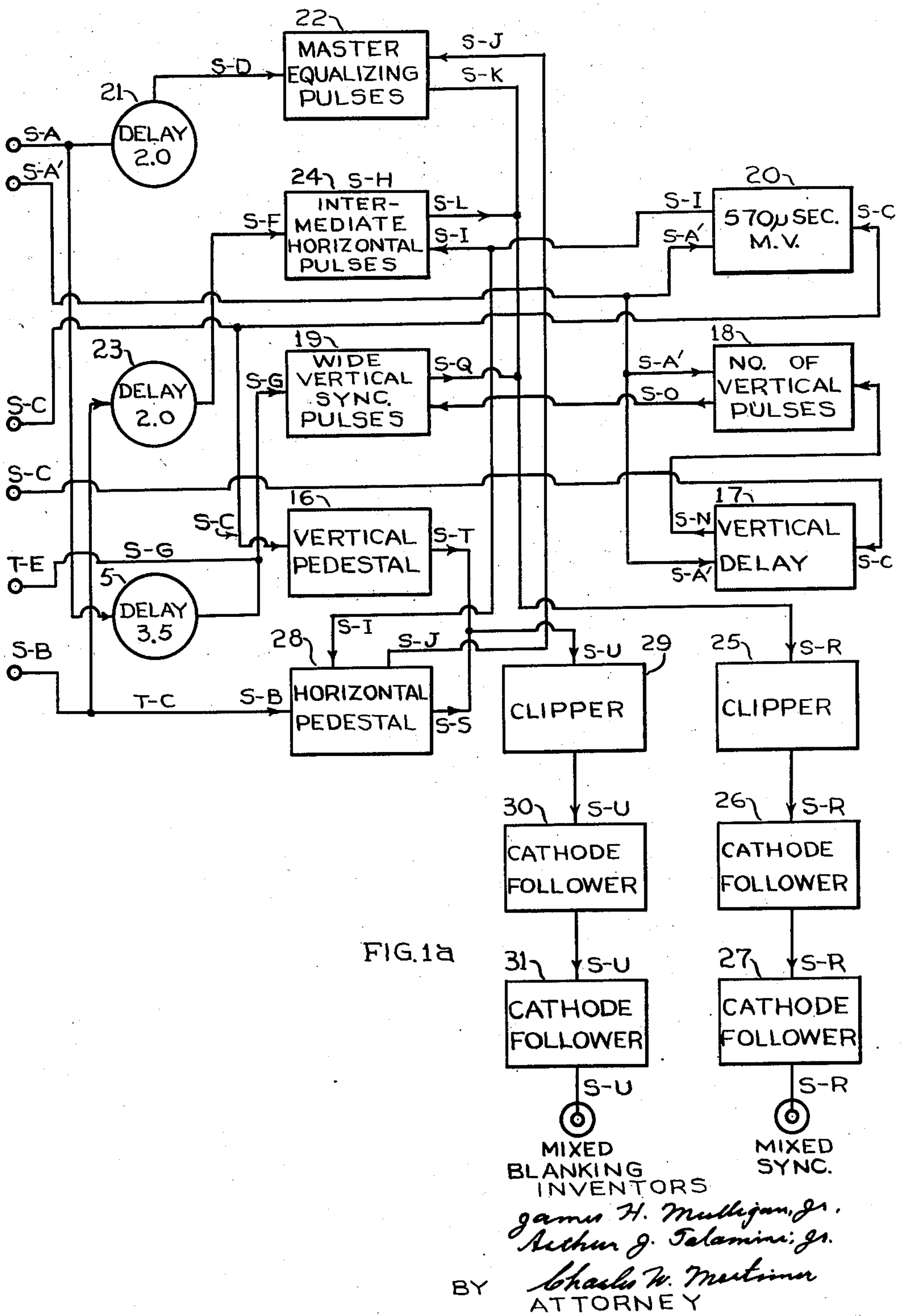

The invention may be understood from the following description in connection with the accompanying drawings in which:

Figs. 1 and 1*a* show a block diagram of the synchronizing signal generator.

Figure 2:
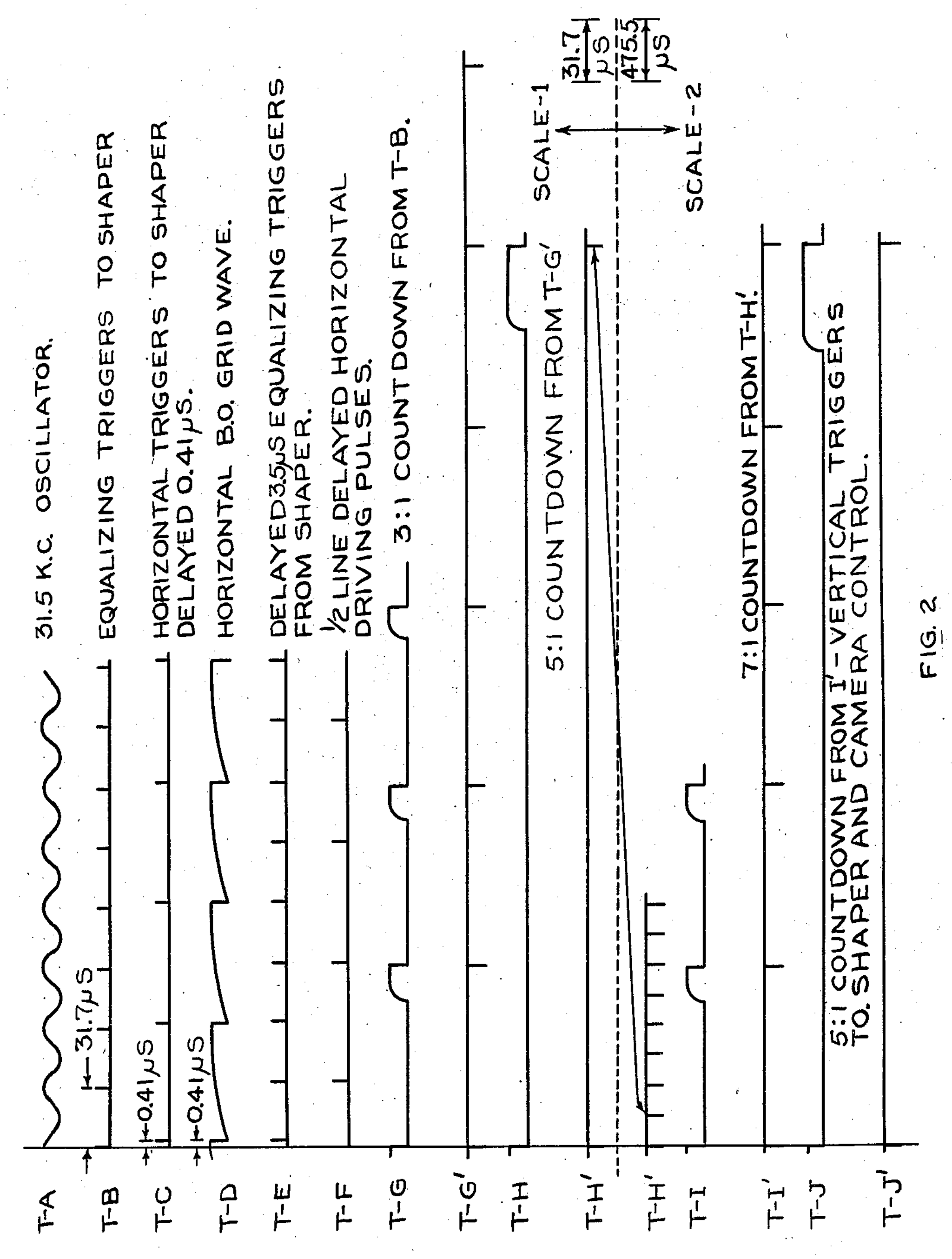
Figure 3:
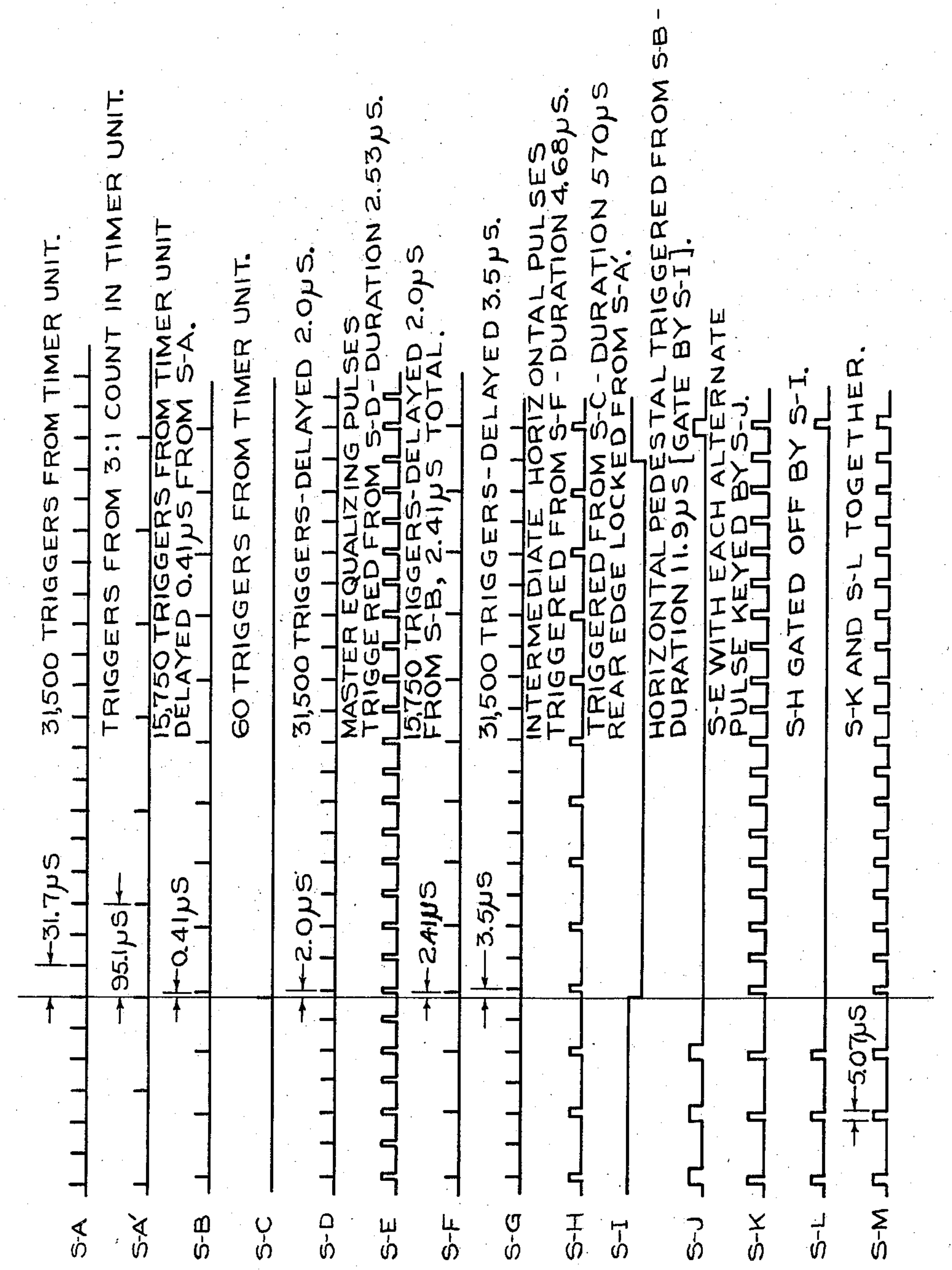

Fig. 2 is a timing diagram of the various pulses generated in the timer unit, and Figs. 3 and 3*a* show timing diagrams of the various pulses generated in the shaper unit.

In the drawings reference character 1 indicates the master oscillator that generates a sine wave at the frequency of 31.5 kc., waveform T—A of Fig. 2. This is used to generate in blocking oscillator or trigger pulse generator 2 of Fig. 1 the equalizing trigger pulses T—B of Fig. 2. This signal T—A is also used to generate in 2:1 blocking oscillator or trigger pulse generator 3 the triggers T—C, at the horizontal repetition rate, delayed 0.41 microsecond.

The waveform T—D is taken from the grid of the blocking oscillator 3 and applied to the suppressor grid of the coincidence blocking oscillator 4. The equalizing triggers T—B of Fig. 2 are delayed 3.5 microseconds in the time delay device 5 of Fig. 1*a* to form the signal T—E of Fig. 2 which is applied to a winding of the transformer of the coincidence blocking oscillator 4 that is shown in more detail and fully described in our co-pending application, Ser. No. 780,641, entitled "A Coincidence Blocking Tube Oscillator," filed of even date herewith. The output of this blocking oscillator 4 is in the form of the pulses T—F of Fig. 2 and is applied to the driving pulse mixer 6 where it is mixed with the vertical signal T—J and sent through the cathode follower 7 to the pick-up auxiliary **7*a*. The vertical pulses are separated from the horizontal pulses in the pick-up auxiliary 7*a***. The horizontal pulses are then passed through a variable delay circuit, then over cables to the pick-up units not shown.

The output T—B of the blocking oscillator 2 is also divided down by three in the multivibrator 8 in the well known manner to form a pulse of the same shape as T—B but at one third of its repetition rate. This is further divided down by five in the multivibrator 9. It is again divided this time by seven, in multivibrator 10, and finally divided in multivibrator 11 by five to form the signal T—J of Fig. 2. A portion of this signal T—J is applied to the driving pulse mixer 6 and another portion is applied through isolation amplifier 12 to the phase discriminator 13 where its phase is compared with that of the 60 cycles per second supply line voltage and any difference that may be present is used to correct the frequency of the oscillator 1 by means of reactance tube 14 in the known way.

The output T—J of the final divider stage 11 is also applied to the isolation amplifier 15. A portion of the output of this amplifier 15, which is of the waveform shown as S—C in Fig. 3, is applied to the vertical blanking or pedestal forming multivibrator 16, Fig. 1*a*, that forms the 60 cycle pulse S—T to blank out the video signal during the vertical retrace time. This is mixed with a similar signal S—S which is the output of the horizontal blanking pulse generator 28 to blank out the video signal during the horizontal retrace time. The combined outputs form the mixed blanking signal S—U, which is applied to the clipper 29.

Another portion of this amplified signal S—C is applied to the vertical delay multivibrator 17, Fig. 1*a*, that determines the time at which the vertical synchronizing signals begin. The output of this multivibrator 17 is of the form shown at S—N of Fig. 3*a*. It is applied to the multivibrator 18 that determines the number of vertical synchronizing signals i. e., six, that appear in a short interval of time. The output of this multivibrator 18 is of the form shown at S—O of Fig. 3*a* and is used to control the output of the multivibrator 19 that generates the vertical synchronizing pulses S—Q.

Another portion of this signal S—C from amplifier 15 is applied to the 570 microsecond delay multivibrator 20, Fig. 1*a*. The output of this multivibrator is of the form shown at S—I in Fig. 3. It determines the length of the combined vertical synchronizing signal.

The trigger pulses having a frequency of 31.5 kilocycles per second which form the signal T—B of Fig. 2 are applied from oscillator 2 through the time delay network 21 that delays them 2.0 microseconds and causes them to take the form S—D of Fig. 3. This signal S—D is used to trigger the multivibrator 22, Fig. 1*a*, that generates the master equalizing pulses S—E.

Another portion of the signal T—B, Fig. 2, (which is the same as S—A, Fig. 3) from oscillator 2 is delayed 3.5 microseconds in the time delay network 5 to produce the signal S—G of Fig. 3 (T—E of Fig. 2). In addition to being applied to coincidence blocking oscillator 4, this output signal S—G is applied to the multivibrator 19 that generates the wide vertical pulses of the form S—P, Fig. 3*a*. This waveform is gated by the signal S—O mentioned above to form the signal S—Q.

The output T—C, Fig. 2, which is the same as the output S—B, Fig. 3, of blocking oscillator 3, that generates trigger pulses at a recurrent frequency of 15.75 kilocycles per second, is applied to a 2 microsecond time delay network 23, Fig. 1*a*, and then has the form S—F, as shown in Fig. 3. These delayed triggering impulses S—F are applied to the multivibrator 24 to form the intermediate horizontal pulses of the form S—H, Fig. 3, that are gated off by the waveform S—I from multivibrator 20 to give the output waveform S—L.

The waveform S—L is mixed with the waveforms S—K and S—Q, Fig. 3*a*, to form the mixed synchronizing signals S—R that are passed through a clipper 25 and two successive cathode follower stages 26 and 27 to supply synchronizing signals to the transmitter, monitors, and other equipment.

A portion of the triggering impulses at the 15,750 cycle repetition rate designated as T—C is applied from multivibrator 3 directly, without the introduction of any delay, to the multivibrator 28, Fig. 1*a*, that generates the horizontal blanking waveform designated as S—J, Fig. 3, after being gated by impulses S—I. The combined outputs S—U of the vertical blanking or vertical pedestal generator 16 and the horizontal blanking or horizontal pedestal generator 28 are applied through the clipper 29 and the cathode followers 30 and 31 to form the mixed blanking signal S—U which is later combined with the mixed synchronizing signals S—R to form the composite synchronizing signal.

A portion of the output of the horizontal blanking generator 28 is applied as signal S—J to the master equalizing pulse generator 22 to control its output and form the signal S—K, which is combined with signals S—L and S—Q to form signal S—R which is applied to the clipper 25.

What is claimed is:

1. A television synchronizing signal generator comprising a timer unit and a pulse shaping unit in which said timer unit contains a sine wave oscillator operating at twice the television horizontal line frequency, the sine wave output of said oscillator being coupled directly to a first trigger pulse generator and a second trigger pulse generator, said first trigger pulse generator being adapted to produce trigger impulses at twice the horizontal line frequency, said second trigger pulse generator being adapted to produce delayed trigger impulses at the horizontal line frequency.

2. Apparatus for generating television synchronizing pulses comprising a circuit for generating equalizing pulses at a frequency twice the horizontal synchronizing pulse rate, a circuit for generating horizontal blanking pulses at the horizontal line scanning rate and a square wave generator generating pulses at the television field rate, said horizontal blanking pulse generating circuit being connected to said equalizing pulse generating circuit to control the output thereof, and said square wave pulse generating circuit being connected to said horizontal blanking pulse generating circuit to control the output thereof.

3. The method of generating television synchronizing pulses which consists in generating equalizing pulses at a rate equal to twice the horizontal line scanning rate, generating horizontal blanking pulses at the horizontal line scanning rate and generating square wave pulses at the television field rate, utilizing said horizontal blanking pulses to control the output of said equalizing pulses and utilizing square wave pulses to control the output of said horizontal blanking pulses.

4. A television synchronizing signal generator comprising a timer unit and a pulse shaping unit, said timer unit containing a sine wave oscillator operating at twice the television horizontal line frequency, the sine wave output of said oscillator being coupled to a first trigger pulse generator and a second trigger pulse generator, said first trigger pulse generator being adapted to produce trigger impulses at twice the horizontal line frequency, said second trigger pulse generator being adapted to produce delayed trigger impulses at the horizontal line frequency, the output of said second trigger pulse generator being connected to a horizontal pedestal signal generator to control the output thereof, a portion of the output of said horizontal pedestal generator being connected to an equalizing pulse generator circuit to control the output thereof, a square wave pulse generator being connected to said horizontal pedestal generator to control the output thereof and control the timing of said equalizing pulse generator thereby to permit equalizing pulses during the television vertical synchronizing period.

5. Apparatus for generating television synchronizing pulses comprising a first source generating pulses at television field repetition rate, a second source generating pulses at an integral submultiple of twice the television line frequency rate, a first rectangular wave pulse generating circuit connected to said first source and said second source and being triggered on and triggered off thereby, a second rectangular wave pulse generating circuit connected to said first rectangular wave generating circuit and to said second source and being triggered on and triggered off thereby.

6. A synchronizing signal generator for a television system comprising a first pulse generating circuit producing groups of electrical pulses, said groups being reproduced at the field repetition rate of said system, said pulses in each said group being reproduced at twice the line repetition rate of said system, a second pulse generating circuit producing electrical pulses at the line repetition rate of said system, a common load impedance connected to each of said pulse generating circuits to mix the outputs thereof, a gating pulse generating circuit connected to gate the output from said second pulse generating circuit at the field repetition rate whereby said pulses at the line repetition rate are interrupted during the period of time said groups of pulses are being produced.

JAMES H. MULLIGAN, Jr.
ARTHUR J. TALAMINI, Jr.

REFERENCES CITED

The following references are of record in the file of this patent:

UNITED STATES PATENTS

| Number | Name | Date |
|---|---|---|
| 2,132,655 | Smith | Oct. 11, 1938 |
| 2,258,943 | Bedford | Oct. 14, 1941 |
| 2,350,536 | Schlesinger | June 6, 1944 |
| 2,401,405 | Bedford | June 4, 1946 |